July 29, 1947.   H. R. ABBRECHT   2,424,873
POWER TRANSMISSION MECHANISM
Filed Aug. 22, 1944    2 Sheets-Sheet 1

INVENTOR.
HERMANN R. ABBRECHT
BY
Oberlin, Limbach & Day.
ATTORNEYS

Patented July 29, 1947

2,424,873

UNITED STATES PATENT OFFICE 2,424,873

POWER TRANSMISSION MECHANISM

Hermann R. Abbrecht, Shaker Heights, Ohio, assignor to The Osborn Manufacturing Company, Cleveland, Ohio, a corporation of Ohio Application August 22, 1944, Serial No. 550,579

3 Claims. (Cl. 74—191)

The present improvements, relating as indicated to transmission mechanism, have as one principal object the provision of such a mechanism which will not only be relatively positive in its action but at the same time provide a certain degree of flexibility of resilience so as to avoid undesired shock in starting and stopping. A further object is to provide a transmission mechanism of the variable type wherein any speed within the range of the transmission can be readily obtained without change of gears and with complete continuity in the rate of change.

To the accomplishment of the foregoing and related ends, said invention, then, consists of the means hereinafter fully described and particularly pointed out in the claims.

The annexed drawing and the following description set forth in detail certain mechanism embodying the invention, such disclosed means constituting, however, but one of various mechanical forms in which the principle of the invention may be used.

Basically my improved power transmission mechanism is characterized by the use of opposed rotary brush-like members which have their faces in frictional engagement with each other so that rotation of one such member will impart corresponding rotation to the other. The member in question will preferably comprise stranded brush material mounted on a suitable rotatable hub or equivalent support so as to extend approximately radially therefrom in closely compacted relation. The outer ends of the component strands which form the face of the member constitute the means whereby one such member is engaged with the other.

Figure 1:
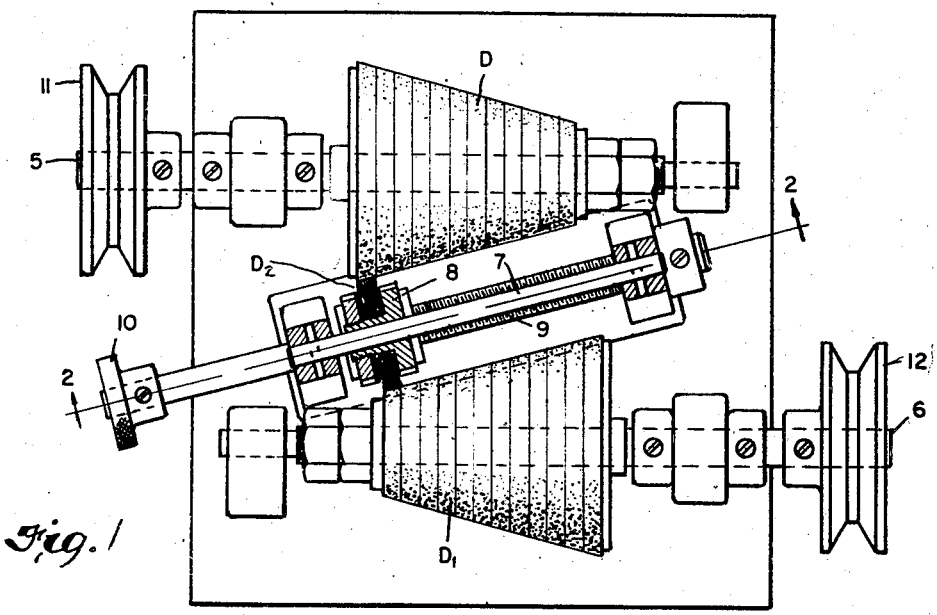
Fig. 1 is a plan view, with certain parts in section, of a variable speed transmission wherein my present improvements have been embodied.
Figures 3, 4:
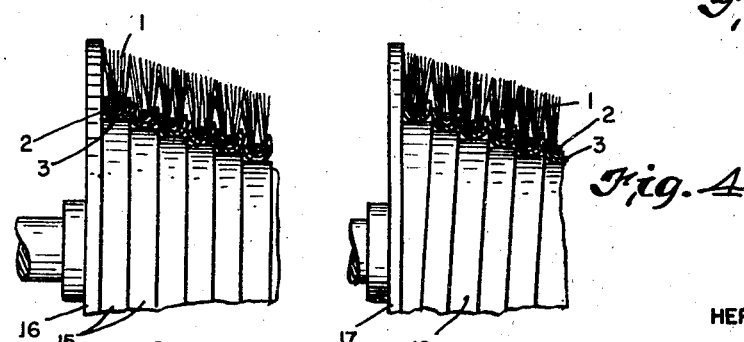
Fig. 3 is a broken sectional view of a detail of the apparatus, specifically one of the transmission members.
Fig. 4 is a similar view to that of Fig. 3 but showing a modification in construction.

Preferably the stranded brush material 1, as shown in the case of the sectioned member illustrated in Fig. 1 and in the broken sections of Figs. 3 and 4, is doubled about a wire 2, or like retaining element, the base of such layer of stranded material being then secured in a U-shaped channel 3 or equivalent holder. Brush elements having the construction just described (also known as brush strip) are currently manufactured in large quantities for use in the construction of rotary and cylindrical brushes. The stranded material which constitutes the body in such brush element may consist of metal wires of any degree of fineness, and either straight or crimped, or of vegetable or synthetic fibers.

Figure 2:
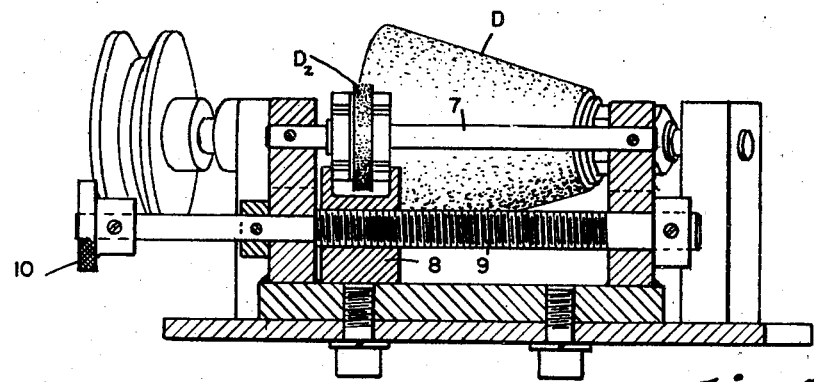
Fig. 2 is a vertical sectional view of such mechanism with parts shown in elevation, the plane of the section being indicated by the line 2—2 Fig. 1.

As previously indicated, the transmission illustrated in Figs. 1 and 2 is of the variable speed type and in its general aspect such transmission will be seen to resemble familiar types of cone pulley drives. However, instead of cone pulleys, the driving and driven members D and D' of the transmission (the relation of which may of course be reversed) consist of reversely extending conical brushes of the general construction described above, such brushes being mounted for rotation about parallel axes provided by shafts 5 and 6 respectively; and a third, smaller, rotary brush $D^2$ being interposed between said conical brushes and having its face in frictional engagement with their juxtaposed faces respectively. Such third brush is freely rotatably mounted on a shaft 7 along which it is longitudinally adjustable as by means of a slide 8 which is engaged by a threaded shaft 9 disposed in parallel relation with such shaft 7 and provided with a knurled knob 10 on its one end, or other suitable means for effecting its rotation. Likewise pulleys 11 and 12 are mounted on the ends of shafts 5 and 6 respectively for transmitting power to and from the mechanism, as will be readily understood.

The intermediate member $D^2$ of the transmission, as indicated, will in effect consist of a rotary brush made up of one or more circularly arranged sections of brush strip of the construction described above and mounted in a suitable holder so that the outer portion of the component stranded brush material will be exposed, or, in other words, the face of the brush left free for engagement with the conical faces of members D and D'. In the case of the latter the brush strip may, as illustrated in Fig. 3, similarly consist of circular sections which will be suitably secured to the successive steps 15 formed on the hub 16 which constitutes the support for the brush strip. However, as shown in Fig. 4, a modified form of hub 17 may be utilized in which a continuous spiral step 18 serves to receive and support the brush strip which here will be spirally wound upon such step.

The successive convolutions of such spirally wound strip obviously constitute the equivalent of the successive circular sections in the form illustrated in Fig. 3.

After the brush strip has been assembled on the hub, whatever the particular form of the latter, the outer ends of the stranded brush material will be desirably trimmed to conform to the surface of a cone, as illustrated not only in detail in Figs. 3 and 4, but also in the assembled apparatus illustrated in Figs. 1 and 2.

The degree of pressure between the engaging faces of the intermediate member $D^2$ and of the reversely disposed conical members D and D' will be varied in the first place to accord with the size of the transmission, i. e. the power to be transmitted. Correspondingly, the size, stiffness and other characteristics of the stranded brush material used in the construction of the three members in question may be varied so as to be capable of transmitting a smaller or greater load as required in any particular transmission. In any event, when the transmission is in operation, the shifting of the member $D^2$ longitudinally of its axis between the two conical members may be very easily effected while at all times maintaining the desired degree of engagement between their respective faces. During such operation the ends of the stranded brush material, which comprise the faces of the transmission members, will interengage more or less, depending upon the adjustment referred to, and at the same time will be capable of a certain amount of flexing. Accordingly, while the drive is quite positive, i. e. slippage will occur only under excessive stress, there is at all times a certain amount of yield in the drive connection which makes for smooth operation, whatever ratio of speed increase or reduction is utilized.

By employing in the case of the conical transmission member a support of general conical form having a stepped face, a brush strip wherein the stranded brush material is of approximately uniform length throughout the extent of the member may be used. There will accordingly be no variation in the transmission of power due to differences in the flexibility of the stranded bodies which constitutes the interengaging faces of the members.

Figure 5:
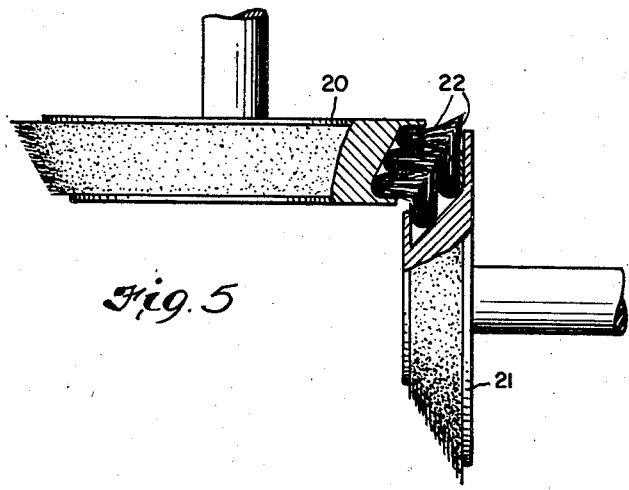
Figs. 5, 6 and 7 respectively illustrate further modifications.

In the modified construction illustrated in Fig. 5, while conical brushes 20 and 21 on the order of those illustrated in Figs. 1 and 2 are employed, such brushes are directly engaged, instead of through an intermediate idler member, so as to constitute an angular drive. For this purpose the faces of the brushes will be relatively narrow, requiring a correspondingly smaller number of annular brush elements 22 than in the case of the previously described variable speed transmission. The manner in which such brush elements are mounted on their respective rotatable supports is shown more or less diagrammatically in Fig. 5, it being understood that such supports may be stepped or otherwise formed to receive and support the brush elements.

Figure 6:
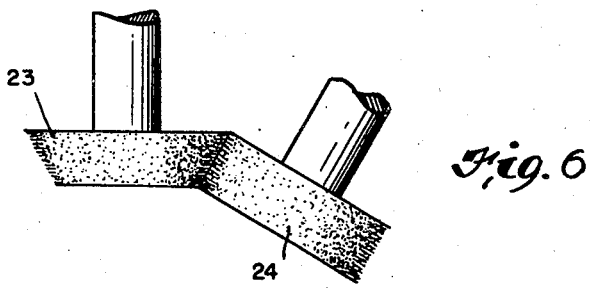

In Fig. 6 another form of angular drive is illustrated in which a conical faced brush 23, similar to brushes 20 and 21, is disposed to engage with a cylindrical brush 24.

Figure 7:
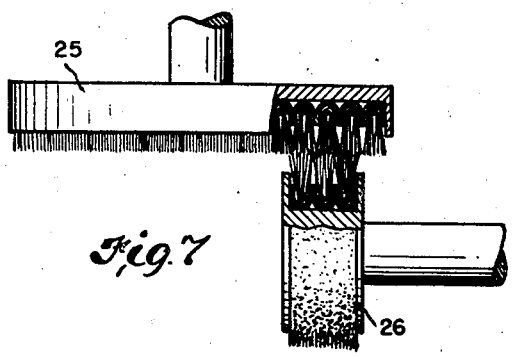

In Fig. 7 another form of variable speed drive is illustrated in which a circular flat faced brush 25 is engaged with a cylindrical brush 26 so mounted as to be adapted to be moved inwardly and outwardly along a radial line of brush 25. The brush elements in the case of such flat faced brush 25 may consist either of circular sections of successively decreasing diameter or of a single strip wound spirally from the center of the brush outwardly to its periphery.

Other modes of applying the principle of my invention may be employed instead of the one explained, change being made as regards the mechanism herein disclosed, provided the means stated by any of the following claims or the equivalent of such stated means be employed.

I therefore particularly point out and distinctly claim as my invention:

1. In a power transmission mechanism comprising opposed rotary brushes having their faces in frictional engagement with each other, a brush element comprising a rotatable support of generally conical form having a stepped face, and brush material mounted thereon so as to project in an approximately radial direction.

2. In a power transmission mechanism comprising opposed rotary brushes having their faces in frictional engagement with each other, a brush element comprising a rotatable support of generally conical form having a spirally stepped face, and helically wound brush strip mounted thereon with the brush material projecting approximately radially in closely compacted relation.

3. In a power transmission mechanism comprising opposed rotary brushes having their faces in frictional engagement with each other, a brush element comprising a rotatable support of generally conical form having a stepped face, and rotary brush sections of progressively reduced diameter mounted thereon with the brush material projecting approximately radially in closely compacted relation.

HERMANN R. ABBRECHT.

REFERENCES CITED

The following references are of record in the file of this patent:

UNITED STATES PATENTS

| Number | Name | Date |
|---|---|---|
| 293,469 | Jaquith | Feb. 12, 1884 |
| 1,999,780 | Goodrich | Oct. 3, 1916 |
| 386,605 | Preator | July 24, 1888 |

FOREIGN PATENTS

| Number | Country | Date |
|---|---|---|
| 565,103 | Germany | Nov. 26, 1932 |